United States Patent Office 3,281,446
Patented Oct. 25, 1966

3,281,446
TOLYLENE DIISOCYANATES STABILIZED WITH 1-PHENYL-2-THIOUREA
David T. Manning, South Charleston, W. Va., assignor to Union Carbide Corporation, a corporation of New York
No Drawing. Filed May 9, 1963, Ser. No. 279,335
2 Claims. (Cl. 260—453)

This invention relates to isocyanate compositions, particularly an isocyanate composition stabilized from discoloration.

Isocyanates are typically colorless liquids or solids which are found to discolor on storage. Discoloration of isocyanates deleteriously affects their saleability typically because the color may be transferred to the product in which the isocyanate is employed. This is particularly so in the case of polyisocyanates used in resin manufacture.

It is herein provided an agent which significantly retards discoloration of the isocyanate product thus allowing storage of the isocyanate for reasonable periods of time prior to use. These agents are particularly effective when employed in solution with the isocyanate.

The agents employed in this invention for retarding discoloration of organic isocyanates are organic thioureas possessing one nitrogen atom bearing two hydrogen atoms, the other nitrogen atom bearing at least one directly-bonded aromatic ring. Of particular significance are thioureas having the formula:

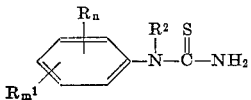

wherein R and $R^1$ may be hydrogen; alkyl of from 1 to 18 carbon atoms, preferably of from 1 to 12 carbon atoms; cycloalkyl, preferably of from 5 to 8 carbon atoms; aryl, preferably monocyclic, bicyclic aryl and fused aryl; alkenyl of from 2 to 18 carbon atoms, preferably of from 2 to 8 carbon atoms; cycloalkenyl, preferably of from 5 to 8 carbon atoms; alkoxy of from 1 to 18 carbon atoms, preferably of from 1 to 12 carbon atoms; aryloxy, preferably monocyclic and bicyclic aryloxy; halogen, such as chlorine, bromine and fluorine; $R^2$ can be hydrogen, alkyl of from 1 to 12 carbon atoms, alkenyl of from 2 to 10 carbon atoms, cycloalkyl of from 5 to 8 carbon atoms or

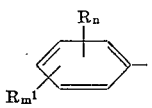

and preferably hydrogen; $n$ is an integer of from 0 to 5; $m$ is an integer of from 0 to 5; and the sum of $n$ and $m$ is equal to 5.

Exemplifications of the aforementioned class of thioureas include 1-phenyl-2-thiourea,
1-(2-methylphenyl)-2-thiourea,
1-(2,4-diethylphenyl)-2-thiourea,
1-(3-butylphenyl)-2-thiourea,
1-(4-octadecylphenyl)-2-thiourea,
1-(1-naphthyl)-2-thiourea,
1-(2-naphthyl)-2-thiourea,
1-(phenanthryl)-2-thiourea,
1-(1-benzanthryl)-2-thiourea,
1-(4-vinylphenyl)-2-thiourea,
1-[3-(2-butenyl)phenyl]-2-thiourea,
1-[4-(5-hexenyl)phenyl]-2-thiourea,
1-(4-vinyl-3-methylnaphthyl)-2-thiourea,
1-(4-cyclohexylphenyl)-2-thiourea,
1-[4-(3-cyclohexenyl)phenyl]-2-thiourea,
1-(2-methoxyphenyl)-2-thiourea,
1-(2-phenoxyphenyl)-2-thiourea,
1-(4-butoxynaphthyl)-2-thiourea,
1-(2-chlorophenyl)-2-thiourea,
1-(4-bromonaphthyl)-2-thiourea,
1-(5-fluorophenanthryl)-2-thiourea,
1-phenyl-1-methyl-2-thiourea,
1-phenyl-1-butyl-2-thiourea,
1-(2-methylphenyl)-1-(2-ethylhexyl)-2-thiourea,
1-(1-naphthyl)-1-(3-butenyl)-2-thiourea,
1-(4-vinylphenyl)-1-cyclohexyl-2-thiourea,
1-phenyl-1-cycloheptyl-2-thiourea,
bis(1-phenyl)-2-thiourea,
bis[1-(2-methylphenyl)]-2-thiourea,
bis(1-phenanthryl)-2-thiourea,
bis[1-(3-butenyl-2-phenyl)]-2-thiourea, and the like. The most preferred thiourea is 1-phenyl-2-thiourea.

The isocyanates which may be treated to retard discoloration are organic mono- and polyisocyanates, such as aliphatic, cycloaliphatic and aromatic mono-, di-, tri- and/or other poly isocyanates which tend to discolor under conditions of moisture and temperature typically associated with industrial storage procedures. Illustrative of organic isocyanates which are beneficially stabilized from discoloration include the following:

tolylene-2,4 and 2,6-diisocyanate,
4,4'-methylenedi-o-tolylisocyanate,
2,4,4'-triisocyanatodiphenylether,
toluene-2,3,6-triisocyanate,
1-methoxy-2,4,6-triisocyanatobenzene,
m-phenylenediisocyanate,
4-chloro-m-phenylenediisocyanate,
4,4'-biphenyldiisocyanate,
1,5-naphthalenediisocyanate,
1,4-tetramethylenediisocyanate,
1,6-hexamethylenediisocyanate,
1,10-decamethylenediisocyanate,
1,4-cyclohexanediisocyanate,
1,2-ethylenediisocyanate,
4,4'-methylenediphenylisocyanate,
bis(4-isocyanatocyclohexyl)methane,
stilbene diisocyanates,
dixylylmethane diisocyanates,
2,2-bis(p-isocyanatophenyl)propane,
diphenylmethane tetraisocyanates,
trimethylbenzene triisocyanates,
phenyltolylmethane triisocyanates,
ditolylmethane triisocyanates,
triphenylmethane triisocyanates,
3,3'-dimethyldiphenylene-4,4'-diisocyanate,
3,3'-dimethoxydiphenylene-4,4'-diisocyanate,
diphenyl triisocyanates and
isomers of bis(p,p'-isocyanatophenyl)cyclohexane.

The particular color retardation agent selected (color stabilizing agents) should be capable of dissolution in the particular isocyanate to be stabilized regardless of whether the isocyanate is a liquid at ambient temperature or must be warmed to transform it to the liquid state. The selected agent should be stable at the temperature of the isocyanate at the time of incorporation, and incorporation be effected at a temperature below that of decomposition or of any undesirable reaction of the isocyanate with itself or the agent. The agent, or mixtures of the agents, should be employed in the isocyanate in any amount sufficient to retard discoloration. Usually that amount falls between 0.005 and 5 percent by weight of the isocyanate. Preferably, the agent is employed in amounts from about 0.01 to 1.0 percent by weight of isocyanate. In general, this invention is directed to employing an amount of the agent sufficient to retard discoloration of the isocyanate.

The following serves to specifically illustrate operation of this invention, however, it is not intended to limit the scope of this invention:

A dry 8-ounce glass bottle is purged with dry nitrogen and charged with a mixture of 150 grams of colorless, pure, freshly-distilled tolylene diisocyanate (80 weight percent 2,4-tolylene diisocyanate and 20 weight percent 2,6-tolylene diisocyanate) and 0.15 gram of 1-phenyl-2-thiourea. The resulting composition is blanketed under dry nitrogen and the bottle securely sealed by wrapping its stopper with tape. A similar sample is prepared, but without the added 1-phenyl-2-thiourea, for use as a blank.

Both the blank and the 1-phenyl-2-thiourea test samples are stored in the dark at room temperature, about 25° C. Examination of the blank and thiourea samples after storage for 22 days reveals the development of a significantly deeper yellow color in the blank. After 5½ months, the 1-phenyl-2-thiourea sample is unchanged and exhibits a significantly weaker yellow color than did the blank after only 22 days of storage.

Though the above relates to specifics of the present invention, this invention is not intended to be restricted thereby except insofar as these specifics appear in the claims.

What is claimed is:

1. A solution of tolylene diisocyanate and from about 0.005 to 5 percent by weight of said diisocyanate of 1-phenyl-2-thiourea.

2. A solution of tolylene diisocyanate and from about 0.01 to 1.0 percent by weight of said diisocyanate of 1-phenyl-2-thiourea.

References Cited by the Examiner
UNITED STATES PATENTS 2,885,421   5/1959   Spiegler _____ 260—453

CHARLES B. PARKER, *Primary Examiner.*

IRVING MARCUS, JOSEPH P. BRUST, *Examiners.*

DALE R. MAHANAND, *Assistant Examiner.*